May 14, 1968  R. G. YEAGER  3,383,527
LOAD CURVE SIMULATOR
Filed March 16, 1965

OUTPUT LOAD CURVES

INVENTOR.
Robert G. Yeager,
BY
H. H. Lossle
Att'ys.

United States Patent Office 3,383,527
Patented May 14, 1968

3,383,527
LOAD CURVE SIMULATOR
Robert G. Yeager, Indianapolis, Ind., assignor to the United States of America as represented by the Secretary of the Navy
Filed Mar. 16, 1965, Ser. No. 440,331
2 Claims. (Cl. 307—297)

ABSTRACT OF THE DISCLOSURE

A solid state electronic simulator device for simulating the output load curve characteristics of nonlinear direct current power sources including solar cells. An output voltage comparison and control circuit comprised of a transistor, a Zener diode, and a potentiometer, and a current comparison and control circuit comprised of a transistor and an adjustable resistance, are coupled via respective isolation resistances to a transistor regulating control circuit to form voltage and current feedback systems for causing the invention to exhibit relatively constant voltage and constant current characteristics. Adjustable resistances are coupled in a manner to permit selection of the desired slopes for the relatively horizontal voltage and vertical current portions, and of the desired curvature of the "knee" of the load curve to be simulated.

---

The invention described herein may be manufactured and used by or for the Government of the United States of America for governmental purposes without the payment of any royalties thereon or therefor.

Background of the invention

The present invention is generally related to the electronic simulation equipment and more particularly to a device for simulating the electrical output characteristics of solar cells and other devices having similar load curve characteristics.

In the area of research and development of solar powered satellites and space vehicles, environmental testing of prototypes and production units of these devices is often required. These devices utilize blades or panels of solar cells as primary and/or auxiliary sources of power. Since the electronic circuitry of these devices must be operative during the various environmental testing procedures, a need exists for a small, reliable device which, when coupled between a source of direct current potential and a satellite or space vehicle under test, will provide direct current power thereto in such manner as to simulate the function and output load curve of the blades or panels of solar cells to be utilized with the vehicle under test when it is actually launched. This need arises because in most environmental testing programs there is not sufficient space within the various test chambers to place the actual solar cell blades during testing of the vehicle and its circuitry, and even if sufficient space were available to enable inclusion of the blades within the test chamber, no outer space solar energy or reasonable simulation thereof would be available to activate the solar cells within the blades. Consequently, no power would be produced to operate the circuitry of the vehicle under test and the inclusion of the blades within the chamber would be of no value. Proper simulation of solar blade load curves is essential in order to provide power dissipation in the current limiting circuitry of the vehicle under test which is equivalent to the dissipation which will occur in its actual operation. The present invention satisfies this need by providing a small, highly reliable, completely solid state, adjustable simulation device which may be utilized, in conjunction with a source of direct current potential, to simulate any nonlinear direct current power source including solar cells.

Accordingly, it is an object of this invention to provide a device for simulating the functions and output characteristics of a nonlinear direct current power source.

Another object is the provision of a device for simulating the functions and output characteristics of a power source comprised of groups of solar cells.

A further object of the invention is to provide a small, highly reliable, completely solid state device for simulating the output load curve characteristics of nonlinear direct current power sources including solar cells.

Brief description of the drawings

Other objects and features of the invention will become apparent to those skilled in the art as the disclosure is revealed in the following detailed description of a preferred embodiment of the invention as illustrated in the accompanying sheet of drawing in which.

Description of the preferred embodiment

Figure 1:
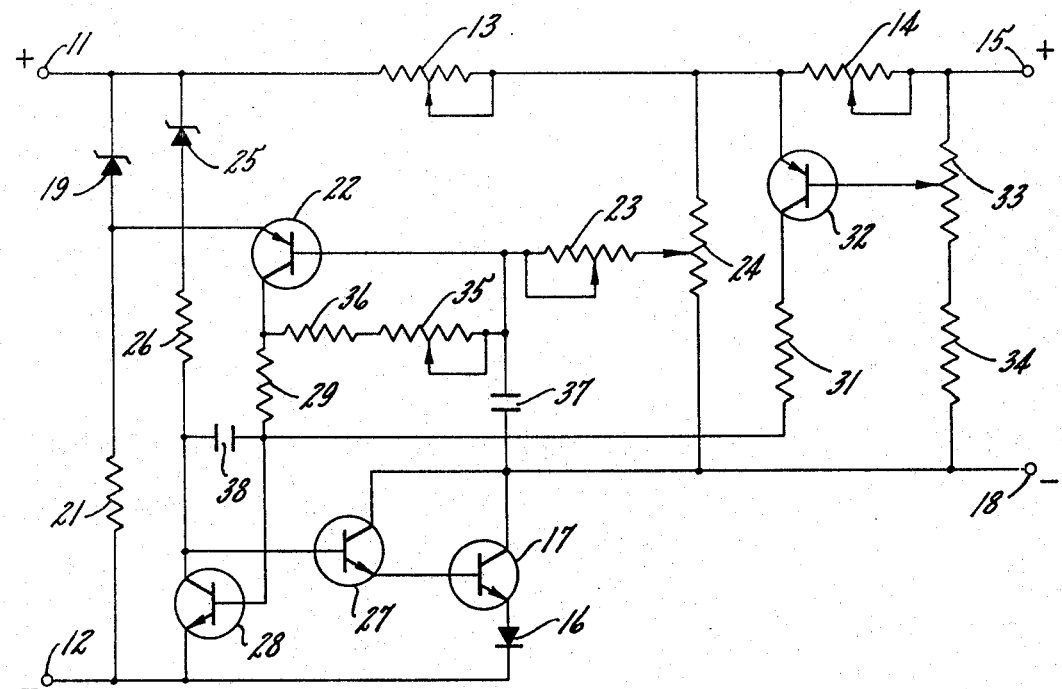
FIGURE 1 is a schematic representation of a suitable embodiment of the invention.

Referring now to the drawing, there is shown in the embodiment of FIGURE 1, terminals 11 and 12 for coupling to a source of direct current potential. Positive terminal 11 is also coupled via an adjustable resistance 13 and an adjustable resistance 14 to a positive output terminal 15, and negative terminal 12 is coupled via a diode 16 and the emitter and collector electrodes of a transistor 17 to a negative output terminal 18. A Zener diode 19 is coupled in series with a biasing resistance 21, across terminals 11 and 12. The anode electrode of Zener diode 19 is also coupled to the emitter electrode of a transistor 22, which has its base electrode coupled via an adjustable resistance 23 to the adjustable tap of a potentiometer 24. Potentiometer 24 has its fixed resistance coupled between the junction of resistances 13 and 14, and output terminal 18. A Zener diode 25 has its cathode electrode coupled to terminal 11 and its anode electrode coupled via a resistance 26 to the base electrode of a driver transistor 27 and to the collector electrode of a transistor 28. Driver transistor 27 has its emitter electrode coupled to the base electrode of regulating transistor 17, and its collector electrode coupled to the collector electrode of transistor 17. Transistor 28 has its emitter electrode coupled to negative terminal 12, and its base electrode coupled via a resistance 29 to the collector electrode of transistor 22, and via a resistance 31 to the collector electrode of a transistor 32, which has its emitter electrode coupled to the junction of resistances 13 and 14 and its base electrode coupled to the adjustable tap of a potentiometer 33. Potentiometer 33 has one end of its fixed resistance coupled to positive output terminal 15 and the other end thereof coupled via a resistance 34 to negative output terminal 18. An adjustable resistance 35 and a resistance 36 are coupled between the base and emitter electrodes of transistor 22. A capacitance 37 is coupled between the base electrode of transistor 22 and output terminal 18, and a capacitance 38 is coupled between the base and collector electrodes of transistor 28.

Figure 2:
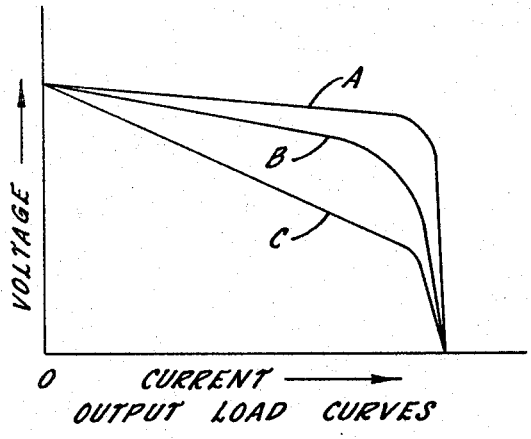
FIGURE 2 depicts a few of the many output load curves which may be simulated by the invention.

In FIGURE 2, curves A, B, and C depict three of the many output load curves which may be simulated by the invention. Curve B closely approximates the output load curve of a blade or panel of solar cells. Curves A and B have relatively constant voltage-constant current characteristics, i.e., if the particular variable load coupled to output terminals 15 and 18 is operating on the relatively horizontal portion of a particular load curve such as curve A or curve B, the invention will exhibit relatively constant voltage characteristics, and when the load increases sufficiently to cause operation along the relatively vertical portion of a particular load curve, the invention will exhibit relatively constant current characteristics.

The embodiment of the invention shown in FIGURE 1 has been constructed and satisfactorily tested utilizing the following values and components:

Transistor 17—2N389
Transistors 22 and 32—2N1243
Transistors 27 and 28—2N2270
Diode 16—1N1124R
Zener Diode 19—1N702
Zener Diode 25—1N1971B
Adjustable Resistances 13 and 14—2 ohms, 12.5 watts
Resistance 21—10,000 ohms
Adjustable Resistance 23—100,000 ohms
Potentiometer 24—5,000 ohms
Resistance 26—1,000 ohms, 2 watts
Resistances 29 and 31—36,000 ohms
Potentiometer 33—100 ohms
Resistance 34—20,000 ohms
Adjustable Resistance 35—5,000,000 ohms
Resistance 36—500,000 ohms
Capacitance 37—.001 mfd.
Capacitance 38—.1 mfd.

It is to be understood that these particular components and values are presented only for illustrative purposes and are not intended to limit the scope of the invention in any way.

*Operation*

With reference to FIGURE 1 and considering first the functions of the various component circuits within the invention, transistor 22, Zener diode 19, and potentiometer 24 comprise an output voltage comparison and control circuit in which the base voltage of transistor 22 is proportional to the output load voltage. Transistor 32 and adjustable resistance 14 comprise a current comparison and control circuit in which the base voltage of transistor 32 is proportional to the output load current passing through series resistance 14. Transistor 17, its driving transistor 27, and shunting control transistor 28 comprise a regulating control circuit. The voltage comparison and control circuit is coupled via an isolation resistance 29, and the current comparison and control circuit is coupled via an isolation resistance 31, to the base electrode of shunting control transistor 28 in the regulating control circuit forming voltage and current feedback systems to cause the invention to exhibit relatively constant voltage-constant current characteristics. The forward voltage drop of diode 16 insures that regulating transistor 17 may be biased to "turn off" if necessary. Adjustable resistance 13 enables the slope of the relatively horizontal or constant voltage portion of the load curve to be adjusted, while adjustable resistance 33 and resistance 34 enable adjustment of the slope of the relatively vertical or constant current portion of the load curve. Adjustable resistance 23 enables the adjustment of the curvature of the "knee" of the load curve to provide a rounded, smooth transition, a sharp transition, or some other desired degree of curvature therebetween as the characteristics of the curve change from relatively constant voltage to relatively constant current. This effect may be observed in FIGURE 2, in which curve B exhibits a relatively smooth transition, that of curve C is relatively sharp, and that of curve A is somewhere between those of curves B and C. It is to be understood that curves A, B, and C are not intended to represent extremes of either slope or transition, and that the invention may be constructed and/or adjusted to provide a relatively infinite number of distinct curves, among which are the depicted curves A, B, and C. Adjustable resistance 35 and resistance 36 enable the point of intersection of the relatively horizontal portion of the load curve with the vertical axis to be maintained at a constant voltage level even though the degree of transition is altered by adjustment of resistance 23; in the absence of resistances 35 and 36, adjustment of resistance 23 could cause this point to shift. Capacitances 37 and 38 act to suppress any possible feedback oscillations in the comparison circuits.

In order to consider the operation of the invention, it will be assumed that a source of direct current potential having a magnitude greater than the greatest anticipated magnitude of any constant voltage portion of a load curve which the invention will be required to simulate (to cause the invention to exercise some control at all times) is coupled between terminals 11 and 12 and that a variable load is coupled across output terminals 15 and 18. Regulating transistor 17 and its driving transistor 27 will normally be conducting due to the bias potential presented to the base electrode of transistor 27 via Zener diode 25 and bias resistance 26. The relative level of conduction, or effective impedance, of transistor 17 controls the magnitude of the potential presented to the load at output terminals 15 and 18, and this relative level of conduction of transistor 17 is controlled by the bias potential applied to transistor 27, which is varied by the level of conduction of shunting transistor 28. Thus any increase in the bias potential applied to the base electrode of shunting transistor 28 will increase the level of conduction therethrough which results in a decrease in the bias potential presented to driving transistor 27, thereby reducing the level of conduction of regulating transistor 17, causing a decrease in the output potential supplied to the load. Thus, it can be seen that a control potential applied to the base electrode of shunting transistor 28, either by voltage comparison and control transistor 22 via resistance 29 or by current comparison and control transistor 32 via resistance 31, will ultimately control the level of conduction of regulating transistor 17, and thereby the load voltage, or the load current dependent upon load voltage. The voltage and current comparison circuits will not act simultaneously to control transistor 28, i.e., one will take precedence over the other, according to the effective resistance of the variable load at any particular time. When the effective resistance of the load is relatively high (light load), the voltage comparison circuit will be operative to cause the invention to provide relatively constant voltage characteristics (horizontal portion of load curve). When the effective resistance of the load is relatively low (heavy load), the current comparison circuit will be operative to cause the invention to provide relatively constant current characteristics (vertical portion of load curve).

The invention would be prepared to simulate a particular load curve, such as that of a solar cell blade or panel repersented by curve B of FIGURE 2, in the following manner. Initially, the adjustable contact of voltage slope resistance 13 would be set to "short" or effectively remove the resistance from the circuit, the adjustable contact of resistance 14 would be positioned so as to place the entire resistance in the circuit to prevent high load currents when output terminals 15 and 18 are short circuited for adjustment purposes, and the adjustable contact of current slope potentiometer 33 would be set to its uppermost position in FIGURE 1 to couple the base electrode of transistor 32 directly to the junction of resistance 14 and terminal 15. With these adjustments made and output terminals 15 and 18 open circuited (corresponding to a load having infinite resistance), potentiometer 24 would be adjusted until the voltage across output terminals 15 and 18 reached the desired voltage reference point indicated by the intersection of the relatively horizontal portion of curve B with the vertical voltage axis. Next, output terminals 15 and 18 would be short circuited via an ammeter (corresponding to a load having zero resistance), and adjustable resistance 14 would be adjusted until the current through terminals 15 and 18 reached the desired current reference point indicated by the intersection of the relatively vertical portion of curve B with the horizontal current axis. The desired voltage slope correspondnig to curve B may be obtained by adjustment of resistance 13 to introduce the desired amount of error into the constant voltage comparison loop, and the desired current slope corresponding to curve B may be obtained by adjustment of potentiometer 33 to introduce the desired amount of error into the constant current comparison loop. The desired degree of curvature at the knee of the curve is obtained by adjustment of resistance 23. Resistance 35 is adjusted to maintain the desired voltage reference point during adjustment of resistance 23. The invention is now prepared to produce the desired load curve as the load varies from zero to infinity.

Thus it becomes apparent from the foregoing description and annexed drawing that the invention, a small reliable, completely solid state, electronic simulator, is a useful and practical device having many applications in the field of electronic simulation equipment.

Obviously many modifications and variations of the present invention are possible in the light of the above teachings. It is therefore to be understood that, within the scope of the appended claims, the invention may be practiced otherwise than as specifically described.

I claim:

1. A solid state electronic simulation device for simulating output load characteristics of various direct current power sources comprising:

first and second input terminals for coupling to a source of direct current potential;

first and second output terminals for coupling to a variable load;

first and second adjustable resistance means coupled in series between said first input terminal and said first output terminal;

transistor regulation means for regulating load voltage and load current, coupled between said second input terminal and said second output terminal and having a control terminal for receiving control signals to cause said transistor regulation means to regulate said load voltage and load current according to a predetermined pattern;

a voltage comparison transistor having first and second conduction electrodes and a control electrode, said first conduction electrode thereof being coupled to a source of constant direct current potential, and said second conduction electrode thereof being resistively coupled to said control terminal of said transistor regulation means;

a first potentiometer means having its fixed resistance coupled between the junction of said first and second adjustable resistance means and said second output terminal and having its adjustable contact coupled via a third adjustable resistance means to said control electrode of said voltage comparison transistor;

a current comparison transistor having first and second conduction electrodes and a control electrode, said first conduction electrode thereof being coupled to the junction of said first and second adjustable resistance means, and said second conduction electrode thereof being resistivity coupled to said control terminal of said transistor regulation means; and a second potentiometer means having its fixed resistance coupled across said first and second output terminals, and having its adjustable contact coupled to said control electrode of said current comparison transistor.

2. A solid state electronic simulation device for simulation output load characteristics of various direct current power sources comprising:

first and second input terminals for coupling to a source of direct current potential;

first and second output terminals for coupling to a variable load;

first and second adjustable resistance means coupled in series between said first input terminal and said first output terminal;

a regulating transistor for regulating load voltage and load current, having first and second conduction electrodes and a control electrode, said first conduction electrode thereof being coupled via diode means to said second input terminal, and said second conduction electrode thereof being coupled to said second output terminal;

a driving transistor for driving said regulating transistor, having first and second conduction electrodes and a control electrode, said first conduction electrode thereof being coupled to said control electrode of said regulating transistor, and said second conduction electrode thereof being coupled to said second conduction electrode of said regulating transistor;

a shunting control transistor having first and second conduction electrodes and a control electrode, said first conduction electrode thereof being coupled to said second input terminal, and said second conduction electrode thereof being coupled in common with said control electrode of said driving transistor and resistively coupled to a source of constant direct current potential;

a voltage comparison transistor having first and second conduction electrodes and a control electrode, said first conduction electrode thereof being coupled to a source of constant direct current potential, and said second conduction electrode thereof being resistively coupled to said control electrode of said shunting control transistor;

a first potentiometer means having its fixed resistance coupled between the junction of said first and second adjustable resistance means and said second output terminal, and having its adjustable contact coupled via a third adjustable resistance means to said control electrode of said voltage comparison transistor;

a current comparison transistor having first and second conduction electrodes and a control electrode, said first conduction electrode thereof being coupled to the junction of said first and second adjustable resistance means, and said second conduction electrode thereof being resistively coupled to said control electrode of said shunting control transistor; and a second potentiometer means having its fixed resistance coupled across said first and second output terminals, and having its adjustable contact coupled to said control electrode of said current comparison transistor.

References Cited

UNITED STATES PATENTS

| 2,832,900 | 4/1958 | Ford | 317—33 |
| 2,888,632 | 5/1959 | Livezey | 307—88.5 |
| 2,888,633 | 5/1959 | Carter | 307—88.5 |
| 2,912,635 | 11/1959 | Moore | 207—88.5 |
| 3,305,725 | 2/1967 | Huge et al. | 307—88.5 |

JOHN S. HEYMAN, *Primary Examiner.*

ARTHUR GAUSS, *Examiner.*

H. DIXON, *Assistant Examiner.*